Sept. 1, 1953  O. W. CARPENTER  2,650,870
SERVICE TRAY FOR AUTOMOBILE INSTRUMENT PANELS
Filed April 30, 1951
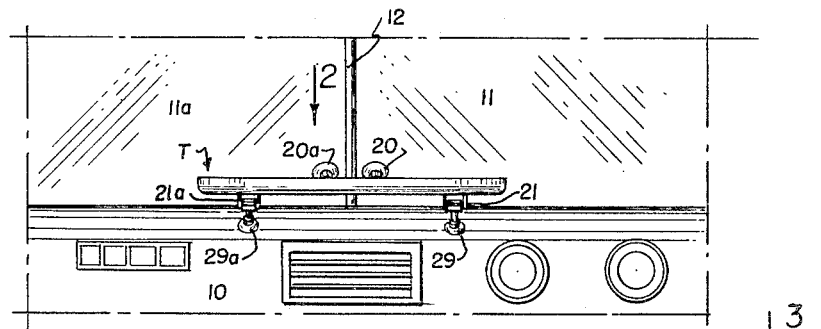
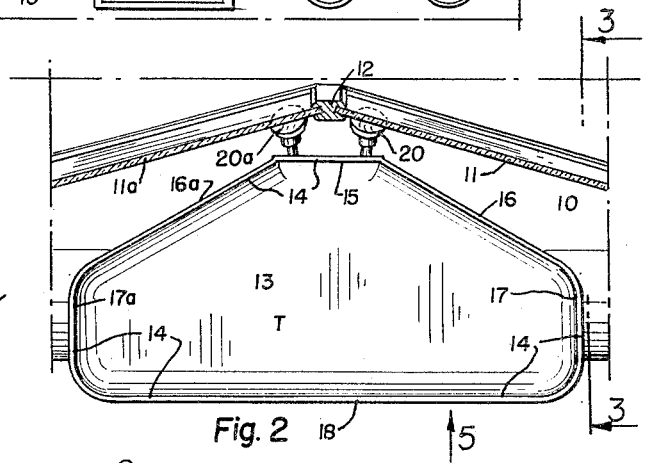
Inventor
OLIVER W. CARPENTER
By Anderson & Muller
Attorneys Patented Sept. 1, 1953

2,650,870

UNITED STATES PATENT OFFICE 2,650,870

SERVICE TRAY FOR AUTOMOBILE
INSTRUMENT PANELS

Oliver W. Carpenter, Lakewood, Colo.

Application April 30, 1951, Serial No. 223,799

2 Claims. (Cl. 311—21)

This invention relates to improvements in tray attachments for automobile instrument panels.

It is the object of this invention to produce a tray designed with special reference to the present type of automobiles that have windshields slanting upwardly and rearwardly at considerable angles and instrument panels that slant and curve in various ways.

Still further objects, advantages, and salient features will become more apparent from the description to follow, the appended claims, and the accompanying drawing, in which:

Figure 1 is a fragmentary rear elevation of an automobile windshield and instrument panel as viewed from the driver's seat in the vehicle;

Figure 2 is an enlarged top plan of a portion of Figure 1;

Figure 3 is a section taken on line 3—3, Figure 2;

Figure 4 is an enlarged fragmentary section taken on line 4—4, Figure 3;

Figure 5 is an enlarged rear elevation, as viewed in the direction of arrow 5, Figures 2 and 3, of one of the rear tray fastening devices, its suction cup being removed;

Figure 6 is a side elevation of Figure 5, as viewed in the direction of arrow 6;

Figure 7 is a section taken on line 7—7, Figure 6; and

Figure 8 is a section taken on line 8—8, Figure 4.

Referring in detail to the drawing, and particularly Figure 1, the portions of the automobile with which the invention is associated are an instrument panel 10 which is disposed within the automobile rearwardly and at the base of the automobile windshield, the latter being shown as a conventional type having a pair of panels 11, 11a joined by a dividing strip 12. As best shown in Figures 2, 3, 4 and 8, the windshield panels are disposed in angular relation, as viewed from a horizontal intersecting plane and each panel slants rearwardly and upwardly, as viewed from a vertical intersecting plane.

The tray T comprises a flat base 13 having an upstanding rim 14 at its periphery, this rim consisting of portion 15, at the front, rearwardly diverging portions 16, 16a, portions 17, 17a, and a portion 18 at the rear. The base forms a support for various articles such as cigarettes, maps, eyeglasses, beverages, food, and a myriad of other small articles which the motorist desires to be readily available, the tray rim preventing these articles from slipping off the tray.

A pair of stems 19, 19a are integrally secured to rim portion 15, the longitudinal axis of each stem being generally perpendicular to the windshield panel with which it is associated, as best shown in Figures 4 and 8. Each stem carries a resilient rubber suction cup, these being shown at 20, 20a, which have an apertured base portion which telescopes over its corresponding stem and resiliently engages same, as best shown in Figure 8. These suction cups engage the windshield panels at each side of the dividing strip 12 and secure the forward end of the tray thereto.

The base 13 of the tray is provided with a pair of identical U-shaped members 21, 21a (Fig. 1) projecting downwardly from its lower surface. Each member 21 comprises a pair of legs 22, 23 secured at their upper ends to the bottom of the tray, and a straight circular pin 24 joining the lower ends of the legs. A downwardly projecting leg 25 is pivotally connected to the pin 24 at its upper end by an integral head member 26, this member being bifurcated, as best shown in Figure 7 and being sufficiently resilient to snap onto the pin when moved in the direction of arrow 27. After being snapped into position it remains connected to the pin for pivotal movement in a vertical plane. The stem is provided with weakening grooves 28 so that the stem may be broken at any desired groove to provide a stem of desired length. The stems carry suction cups, 29, 29a like those previously described, which telescopically engage the lower ends of the stems in the same manner. Legs 22, 23 are provided with enlarged abutments 30, 31, adjacent the ends of pin 24 which prevent head member 26 from moving off the pin in axial directions thereof.

While the tray has been disclosed as attached to a windshield having planar panels with a dividing strip therebetween it will be apparent that it may also be employed with rearwardly sloping windshields which curve in a horizontal plane but formed as a single panel, rather than two. The suction cups are also sufficiently resilient to permit them to distort on the various stems so that they may engage surfaces departing from the relationship shown. The forward suction cups permit securing the tray in a desired position above the instrument panel. The rear cups, by reason of their pivotal connections to the bottom of the tray and adjustability relative thereto by selecting a desired stem length, provide adjustable supports for levelling the tray above instrument panels of various shapes. The angle between rims 16, 16a is chosen so that the tray will fit between windshield panels of minimum included angle with 16, 16a, substantially parallel thereto, and as this angle increases, as shown in Figure 2, it is apparent that it will fit between all other windshields having a greater angle. The spacing between rim 15 and the windshield also permits attaching the tray to a very wide range of differently shaped windshields. Since the tray may be fitted to nearly all present automobiles it will be apparent that its cost may be minimized because of reduction in manufacturing equipment and inventories of distributors and the like.

Any suitable material may be employed for the tray and the securing stems projecting therefrom; however, I prefer to construct all parts thereof, except for the rubber suction cups, from a suitable plastic material injection molded into a suitable mold since this construction is conducive to mass production at relatively low cost.

Referring to Figure 3, it will be observed that by a suitable choice of length of stems 25 and/or a desired position of securement of the suction cups to the windshield, the tray may be secured to the vehicle in level position.

I claim:

1. A tray for use in an automobile of the type having a windshield and an instrument panel adjacent and rearwardly of the lower end thereof, a tray adapted to be disposed above the instrument panel, to the rear of the windshield, said tray having a flat surface of extended area surrounded by an upwardly ranging rim, two stems integral with the rim, projecting from the rim on one edge of the tray said stems being upwardly ranging with respect to the plane of the tray, suction cup on the ends of said stems, and two spaced legs pivotally connected to the bottom of the tray adjacent the edge opposite from the upwardly ranging stems, forming a support for the rear of the tray.

2. A device in accordance with claim 1 in which the lower ends of the legs are provided with suction cups.

OLIVER W. CARPENTER.

References Cited in the file of this patent

UNITED STATES PATENTS

| Number | Name | Date |
|---|---|---|
| 1,403,317 | Gross | Jan. 10, 1922 |
| 1,483,640 | Manning | Feb. 12, 1924 |
| 1,723,238 | Hoot | Aug. 6, 1929 |
| 2,083,054 | Cline | June 8, 1937 |
| 2,494,980 | Zuckerman | Jan. 17, 1950 |
| 2,536,084 | Peters et al. | Jan. 2, 1951 |
| 2,539,276 | Schmeling | Jan. 23, 1951 |
| 2,556,724 | Hubsch | June 12, 1951 |

FOREIGN PATENTS

| Number | Country | Date |
|---|---|---|
| 258,084 | Great Britain | Sept. 16, 1926 |